US006961818B1

(12) United States Patent
Sade et al.

(10) Patent No.: US 6,961,818 B1
(45) Date of Patent: *Nov. 1, 2005

(54) METHOD, SYSTEM AND COMPUTER PROGRAM PRODUCT FOR MANAGING DATA IN A MIRRORED CACHE USING AN ACCESS BALANCING TECHNIQUE

(75) Inventors: Gilad Sade, Newton, MA (US); Eli Shagam, Brookline, MA (US); Natan Vishlitzky, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 376 days.

This patent is subject to a terminal disclaimer.

(21) Appl. No.: 09/824,083

(22) Filed: Apr. 2, 2001

Related U.S. Application Data

(63) Continuation-in-part of application No. 09/676,686, filed on Sep. 29, 2000, now Pat. No. 6,591,335.

(51) Int. Cl.$^7$ .............................................. G06F 12/00
(52) U.S. Cl. ..................................... 711/119; 711/162
(58) Field of Search ....................... 711/162, 165, 119, 711/157; 714/6

(56) References Cited

U.S. PATENT DOCUMENTS 5,724,501 A * 3/1998 Dewey et al. ................. 714/9
5,987,569 A * 11/1999 Takahashi et al. .......... 711/119
6,502,165 B1 * 12/2002 Kishi et al. .................. 711/114
6,571,350 B1 * 5/2003 Kurokawa et al. ............ 714/6
6,591,335 B1 * 7/2003 Sade et al. .................. 711/113
6,604,171 B1 * 8/2003 Sade ........................... 711/113

FOREIGN PATENT DOCUMENTS

WO       WO 99/15957       * 4/1999

* cited by examiner

Primary Examiner—Christian P. Chace
(74) Attorney, Agent, or Firm—Choate, Hall & Stewart LLP (57) ABSTRACT

A method, system, and computer program product are disclosed for managing data in a cache. A first cache memory is provided that includes data. A second cache memory is provided that also includes data in which at least some of the data in the first cache memory is the same as at least some of the data in the second cache memory. In response to a request for data that is stored in both the first and second cache memories, one of the cache memories is chosen in accordance with an access balancing technique. The access balancing technique may include at least one of selection using round robin, and selection based on statistical analysis such as access frequency of the first and second cache memories. First and second access balancing techniques may be used for data accessed from the cache memories, which may comprise disk data and control data, such as data indicating whether data in the caches has been modified and is write pending.

41 Claims, 10 Drawing Sheets

METHOD, SYSTEM AND COMPUTER PROGRAM PRODUCT FOR MANAGING DATA IN A MIRRORED CACHE USING AN ACCESS BALANCING TECHNIQUE

CROSS REFERENCE TO RELATED APPLICATIONS

This application is a continuation in part of U.S. patent application Ser. No. 09/676,686 filed on Sep. 29, 2000, now U.S. Pat. No. 6,591,335.

BACKGROUND OF THE INVENTION

1. Field of the Invention

This application relates to the field of computer data storage and more particularly to the field of using a cache memory in a computer data storage device.

2. Description of Related Art

Host processor systems may store and retrieve data using a storage device containing a plurality of host interface units, disk drives, and disk interface units. Such storage devices are provided, for example, by EMC Corporation of, Hopkinton Mass. and disclosed in U.S. Pat. No. 5,206,939 to Yanai et al., U.S. Pat. No. 5,778,394 to Galtzur et al., U.S. Patent No. 5,845,147 to Vishlitzky et al., and U.S. Pat. No. 5,857,208 to Ofek. The host systems access the storage device through a plurality of channels provided therewith. Host systems provide data and access control information via the channels of the storage device and the storage device provides data to the host systems also through the channels. The host systems do not address the disk drives of the storage device directly, but rather, access what appears to the host systems as a plurality of logical disk units. The logical disk units may or may not correspond to the actual disk drives.

Performance of such a storage system may be improved by using a cache. In the case of a disk drive system, the cache may be implemented using a block of semiconductor memory that has a relatively lower data access time than the disk drive. Data that is/accessed is advantageously moved from the disk drives to the cache so that the second and subsequent accesses to the data may be made to the cache rather than to the disk drives. Data that has not been accessed recently may be removed from the cache to make room for new data. Often such cache accesses are transparent to the host systems requesting the data.

In instances where the host systems write data to the disk, it may be efficient to have the write operation initially occur only in the cache. The data may then be transferred from the cache back to the disk at a later time, possibly after subsequent read and write operations. Transferring the modified cache data to the disk is referred to as "destaging".

If the cache memory fails after one or more write operations but prior to destaging the modified cache data to the disk, then the disk data may not match the data that was written by the host system. Such a situation may be especially troublesome in instances where the use of the cache is transparent to the host, i.e., in systems where the host system writes data and the write operation is acknowledged by the storage device (because the data is successfully written to the cache), but then the data is never appropriately transferred to the disk because of cache failure. Numerous solutions have been proposed to handle cache failures.

U.S. Pat. No. 5,437,022, U.S. Pat. No. 5,640,530, and U.S. Pat. No. 5,771,367, all to Beardsley et al, disclose a system having two, somewhat—independent, "clusters" that handle data storage. The clusters are disclosed as being designed to store the same data. Each of the clusters includes its disks own cache and non-volatile storage area. The cache from one of the clusters is backed up to the non-volatile data storage area of the other cluster and vice versa. In the event of a cache failure, the data stored in the corresponding non-volatile storage area (from the other cluster) is destaged to the appropriate disk. However, this system requires, in effect, a duplicate backup memory for each of the caches and also provides that whenever data is written to one of the caches, the same data needs to be written to the corresponding non-volatile storage in the other cluster. In addition, since each cluster includes a cache and a non-volatile storage, thus having two redundant clusters requires four memories (one cache for each of the clusters and one non-volatile storage for each of the clusters).

It is desirable to have a system that provides sufficient redundancy in the case of failure of a cache element without unduly increasing the complexity of the system or the number of elements that are needed.

SUMMARY OF THE INVENTION

In accordance with a first aspect of the invention, a method of managing data in a cache is described. A first cache memory is provided that contains data. A second cache memory is provided that contains data wherein at least some of the data in the first cache memory is the same as at least some of the data in the second cache memory. In response to a request for data that is stored in both the first cache memory and the second cache memory, one of the cache memories is chosen to use to obtain the data according to an access balancing technique.

In accordance with another aspect of the invention, a computer program product for managing data in a cache is described. Machine executable code is included for: providing a first cache memory that contains data; providing a second cache memory that contains data wherein at least some of the data in the first cache memory is the same as at least some of the data in the second cache memory; and, in response to a request for data that is stored in both the first cache memory and the second cache memory, choosing one of the cache memories to use to obtain the data according to an access balancing technique.

In accordance with yet another aspect of the inventions, a system for managing data in a cache is described. A first cache memory includes data. A second cache memory includes data) wherein at least some of the data included in the first cache memory is the same as at least some of the data of the second cache memory. Cache selection hardware is included for selecting, in response to a request for data that is stored in both the first cache memory and the second cache memory, which one of the first and second cache memories to use to obtain the data in accordance with an access balancing technique.

DETAILED DESCRIPTION OF THE PREFERRED EMBODIMENT(S)

Figure 1A:
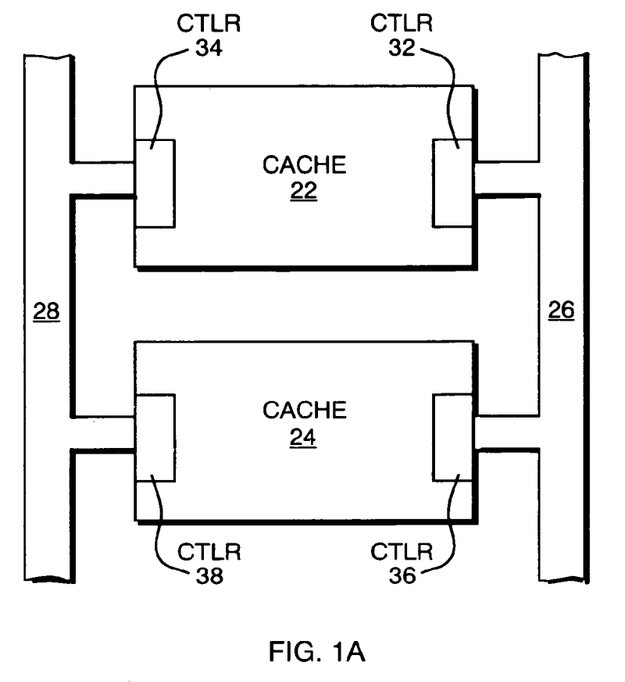
FIG. 1A shows a pair of cache memories where each cache memory is coupled to a pair of buses in an embodiment of the system described herein.

Referring to FIG. 1A, a schematic diagram shows a first cache memory 22, and a second cache memory 24 each coupled to a first bus 26 and a second bus 28. The cache memories 22, 24 and the buses 26, 28 may be part of a larger system, such as a data storage device provided by EMC Corporation of Hopkinton, Mass. Data may be written to and read from the memories 22, 24 via the busses 26, 28. The first memory 22 may be coupled to the first bus 26 via a first controller 32 and may be coupled to the second bus 28 via a second controller 34. Similarly, the second memory 24 may be coupled to the first bus 26 via a third controller 36 and may be coupled to the second bus via a fourth controller 38. The busses 26, 28 may be deemed "odd" and "even" for reference purposes. Similarly, the memories 22, 24 may be deemed "top" and "bottom".

In some embodiments, the buses 26, 28 are entirely redundant and each of the buses 26, 28 is coupled to all of the disk controllers (not shown) and host interface units (not shown) of the corresponding storage device. In other embodiments, each of the buses 26, 28 may be connected to a different set of host interface units and disk controllers, possibly with some overlap. Alternatively still, it is possible to have one of the buses 26, 28 couple to all of the host interface units while the other one of the buses 26, 28 is coupled to all of the disk controllers. Configuring and managing the redundancy of the buses 26, 28 may be provided according to a variety of functional factors known to one of ordinary skill in the art, and the system described herein is adaptable to any such configuration. Note that it is possible to further subdivide the busses 26, 28 and the components connected thereto to reduce the likelihood of bringing the whole system down in connection with failure of a bus or of a component thereof.

Figure 1B:
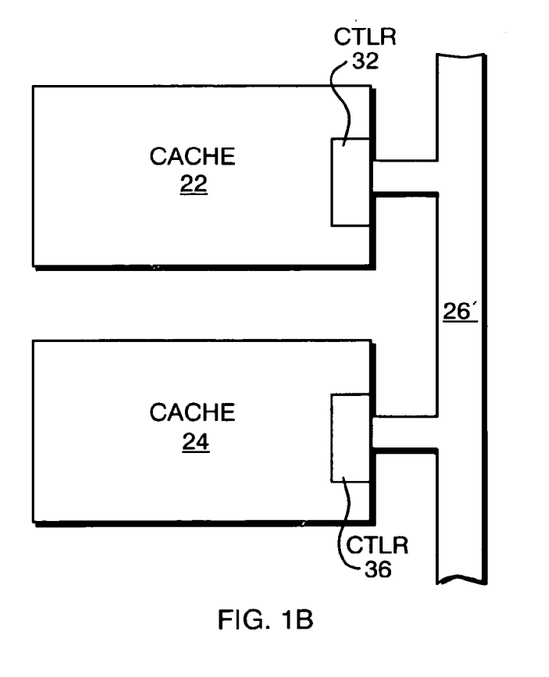
FIG. 1B shows a pair of cache memories coupled to a single bus in another embodiment of the system described herein.

Referring to FIG. 1B, a schematic diagram 30 shows an alternative embodiment where the first cache memory 22 and the second cache memory 24 are both coupled to a single bus 26'. In the embodiment of FIG. 1B, the bus 26' may be coupled to all of the host interface units and all of the disk controllers of the corresponding storage device. The system described herein may be configured with either the embodiment of FIG. 1A, the embodiment of FIG. 1B, or other configurations of one or more buses coupled to the cache memories 22, 24.

Figure 2:
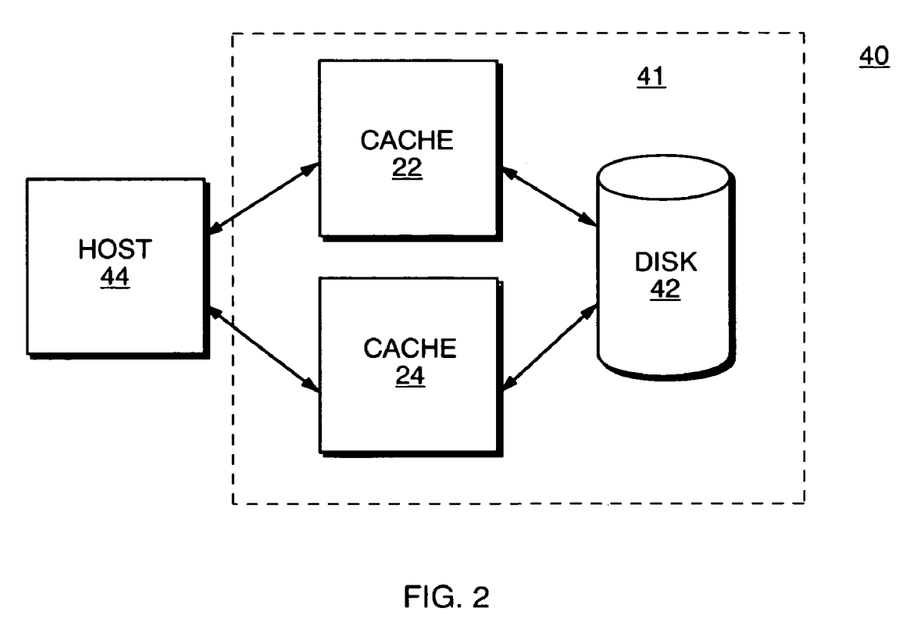
FIG. 2 is a schematic diagram illustrating a host system coupled to a storage system containing a pair of cache memories and a disk storage area according to the system described herein.

Referring to FIG. 2, a schematic diagram illustrates a storage system 41 and the flow of data between the cache memories 22, 24, a disk storage area 42, and a host system 44. Data flows between the first cache memory 22 and the disk storage area 42 and flows between the first cache memory 22 and the host system 44. Similarly, data flows between the second cache memory 24 and the disk storage area 42 and between the second cache memory 24 and the host system 44. Specific control of the data between the host system 44, the cache memories 22, 24, and the disk storage area is described elsewhere herein.

Figure 3:
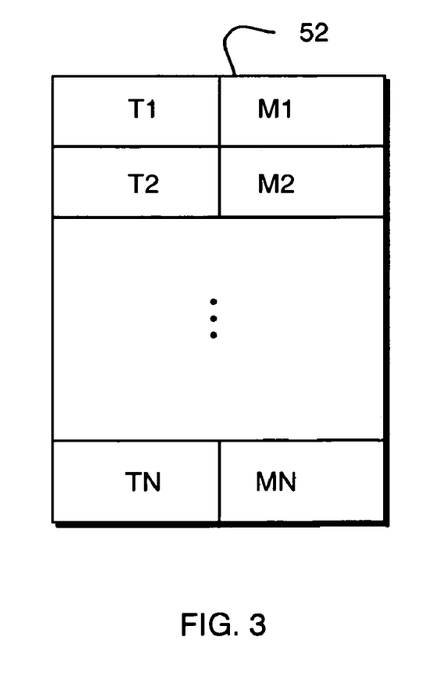
FIG. 3 is a table that may be used to determine primary and secondary cache memories for each of the slots of the disk storage area of the system described herein.

Referring to FIG. 3, a table 52, which is part of the data that is used to control operation of the storage system 41, indicates portions T1, T2 . . . TN of the cache memories 22, 24 that are to be designated as primary storage areas. In one embodiment, the cache memories 22, 24 are mapped alternatively so that, for example, a first set of portions may be designated as primary for the cache memory 22 while a second set of portions may be designated as primary for the cache memory 24, where the first and second sets are interposed. In some embodiments, the portions are ¼ Gigabyte in size, although it will be apparent to one of ordinary skill in the art that the invention may be practiced using other sizes. The purpose of the mapping is discussed in more detail elsewhere herein.

Figure 4:
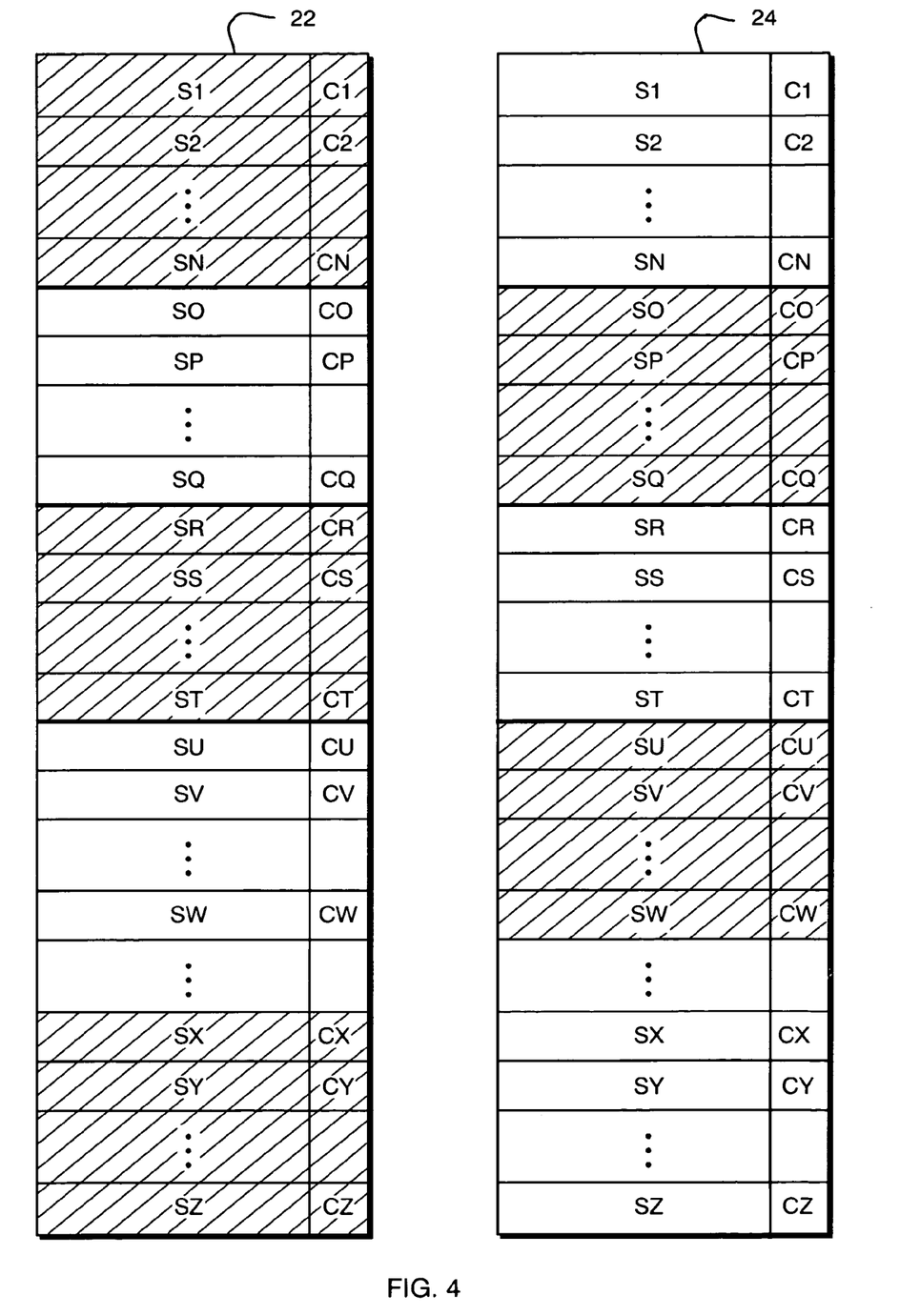
FIG. 4 shows a pair of cache memories having slots and control data associated therewith according to the system described herein.

Referring to FIG. 4, a schematic diagram illustrates the cache memories 22, 24 in more detail. In some embodiments, each of the cache memories 22, 24 is implemented using separate hardware. Each of the cache memories 22, 24 is shown as containing a plurality of slots S1, S2, . . . SZ which, for embodiments discussed herein, provide storage for a sector of the disk storage area 42. For the embodiments illustrated herein, one sector equals eight blocks and one block equals five hundred and twelve bytes. However, it will be apparent to one of ordinary skill in the art that other sizes may be used without departing from the spirit and scope of the system described herein.

Associated with each of the slots may be specific control data elements C1, C2, . . . CZ, so that control data element C1 is associated with slot S1, control data element C2 is associated with slot S2, and so forth. For the system described herein, there is control data associated with each block and each sector. In addition, in some embodiments, it is possible to indicate that particular blocks of data are write pending, rather than indicating that an entire sector, to which the block belongs, is write pending. However, the discussion herein will emphasize control data and the write pending state for sectors.

Each of the slots represents data that is read from the disk storage area 42 and stored in one or both of the cache memories 22, 24. The control data for each of the slots indicates the state of the data in the slot. Thus, for example, the control data element for a slot can indicate that the data has been read from the disk storage area 42 but not written to by the host 44 (i.e., not modified by the host 44). Alternatively, the control data element for a slot could indicate that the data in the slot has been written to by the host 44 since being read from the disk storage area 42 (i.e., write pending). Note that, generally, data that is read from the disk storage area 42 but not subsequently modified may be eliminated from the cache without any ultimate loss of data since the data in the cache memories 22, 24 is the same as the data in the disk storage area 42. On the other hand, data that is write pending (i.e., modified while in the cache memories 22, 24 after being read from the disk storage area 42) is written back to the disk storage area 42 for proper data synchronization. Note also that the control data could indicate that the associated slot contains data that is the same in both of the cache memories 22, 24, which could occur, for example, either when the data is write pending or immediately after data that is write pending is written to the disk.

In one embodiment, data that is read from the disk storage area 42 is written to one or the other of the cache memories 22, 24. The shading of the slots in the memories 22, 24 in FIG. 4 indicates that a slot has been designated as a secondary slot. Thus, for example, the slots S1, S2 . . . SN of the cache memory 22 are designated as secondary slots while the slots SO, SP, . . . SQ of the cache memory 24 are designated as secondary slots. Conversely, the slots SO, SP, . . . SQ of the cache memory 22 are designated as primary slots while the slots S1, S2, . . . SN of the cache memory 24 are designated as primary slots.

In one embodiment, data that is read from the disk storage area 42 is written only to the corresponding primary slot and, at least initially, is not written to the secondary slot. Thus, for example, if a sector of data is to be provided in slot S1, the data is read from the disk and is initially written only to the cache memory 24. Similarly, data from the disk designated for slot SP is initially written only to the cache memory 22. The hardware may be used, in a conventional manner, to control writing to one of the cache memories 22, 24 or writing to both of the cache memories 22, 24 simultaneously (and/or with a single command). Similarly, the hardware may control which of the cache memories 22, 24 is read.

If an event occurs causing data in the cache memories 22, 24 to change (such as a write from the host 44), then the modified data is written to both the primary memory and to the secondary memory. For example, data that is designated for slot S1 is initially written from the disk storage area 42 only to the cache memory 24. However, if a subsequent operation occurs that causes the data in slot S1 to change (i.e., a write by the host 44 to the slot S1 portion of the cache memory 24 corresponding to the disk storage area 42), then the data in slot S1 is modified according to the write operation which writes data to both of the memories 22, 24. Thus, data that is write pending exists in both of the cache memories 22, 24. Note that, in some instances, unmodified but related data in a slot may be copied from one of the memories 22, 24 to the other one of the memories 22, 24.

The state of the data in the slots is indicated by the control data. Thus, in the case of data that has not been modified, the corresponding control data element indicates that the data has not been modified while, in the case of data that has been modified, the corresponding control data element indicates that the data is write pending. The control data for the slots is written to both of the cache memories 22, 24. Thus, in the event of loss of the hardware associated with one of the cache memories 22, 24, the entirety of the control data will exist in the non-failing one of the cache memories 22, 24. Stated differently, the control data information in one of the cache memories 22, 24 is identical to the control data information in the other one of the cache memories 22, 24.

Note that any data that is write pending in the cache is provided in both of the cache memories 22, 24. On the other hand, data that does not need to be written back to the disks (i.e., data that has not been modified by the host 44) is stored in only one of the cache memories 22, 24. Storing the data in only one of the cache memories 22, 24 is an optimization that can increase performance by requiring only one write to one of the cache memories 22, 24 in certain instances, while also providing a mechanism where write pending cache data is written to both of the cache memories 22, 24. In addition, note that, as discussed above, identical data may be stored in corresponding slots in both of the memories 22, 24 even though the data is not write pending. This may occur, for example, immediately after write pending data is copied to the disk.

Figure 5:
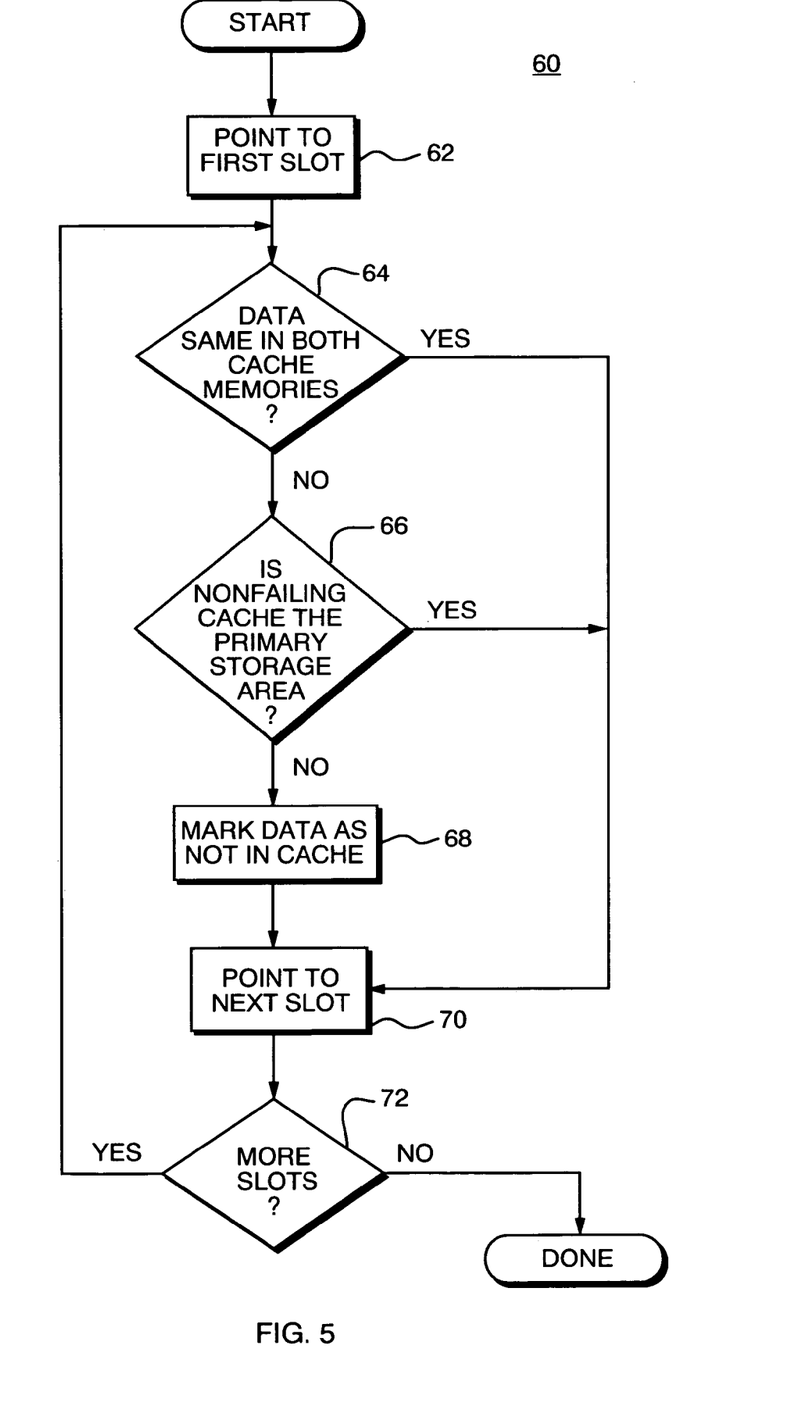
FIG. 5 is a flow chart illustrating steps performed in connection with failure of the hardware associated with one of the pair of cache memories.

Referring to FIG. 5, a flow chart 60 illustrates steps performed in the event that the hardware associated with one of the cache memories 22, 24 fails. Implementing each of the cache memories 22, 24 with separate hardware increases the likelihood that failure of the hardware for one of the cache memories 22, 24 will not occur at the same time as failure of the hardware for another one of the cache memories 22, 24. Detection of the failure of one of the cache memories 22, 24 is provided in a straightforward manner, such as described in U.S. Pat. No. 5,724,501 to Dewey et al., which is incorporated by reference herein. Note that detection of a failure may occur during an initial self test.

Processing begins at a first step 62 where a pointer is set to point to the first slot of the good cache memory (i.e., the one of the cache memories 22, 24 that has not failed). Following the step 62 is a test step 64 where it is determined if the data stored in the slot that is pointed to is duplicated in the cache memories (i.e., is the same for both of the cache memories 22, 24). As discussed above, this is indicated by the corresponding control data for the slot. Note that this information is available irrespective of whether the slot of the non-failing one of the cache memories 22, 24 is a primary or a secondary storage area, since all of the control data is duplicated between the cache memories 22, 24, as discussed elsewhere herein.

If it is determined at the test step 64 that the data for the slot is not the same for both of the memories 22, 24, then control passes from the test step 64 to a test step 66 where it is determined if the non-failing cache memory (i.e., the one of the cache memories 22, 24 that is being examined) is the primary storage area for the data. If it is determined at the test step 66 that the slot being examined is not the primary storage area for the data (and thus the data is not stored in the non-failing cache memory), then control passes from the test step 66 to a step 68 where the control data for the slot is modified to indicate that the corresponding data is not in the cache. The step 68 is executed because the data corresponding to the slot being examined is stored in the failed one of the cache memories 22, 24 and thus, effectively, is no longer in the cache.

Following the step 68 is a step 70 where the next slot of the non-failing cache is pointed to in order to be examined on the next iteration. Following the step 70 is a test step 72 where it is determined if processing is complete (i.e., no more slots remain to be examined). If it is determined at the test step 72 that there are more slots to examine, then control transfers back to the step 64 to process the next slot.

Note that the step 70 is also reached from the step 64 if it is determined that the data is the same in both of the cache memories 22, 24 and that the step 70 is also is reached from the test step 66 if it is determined that the data, although not the same in both of the cache memories 22, 24, is stored in the non-failing one of the cache memories 22, 24. This is because, in either of these cases, it is not necessary to mark the control data for the slot being examined as indicating that the data is not in cache at the step 68.

Figure 6:
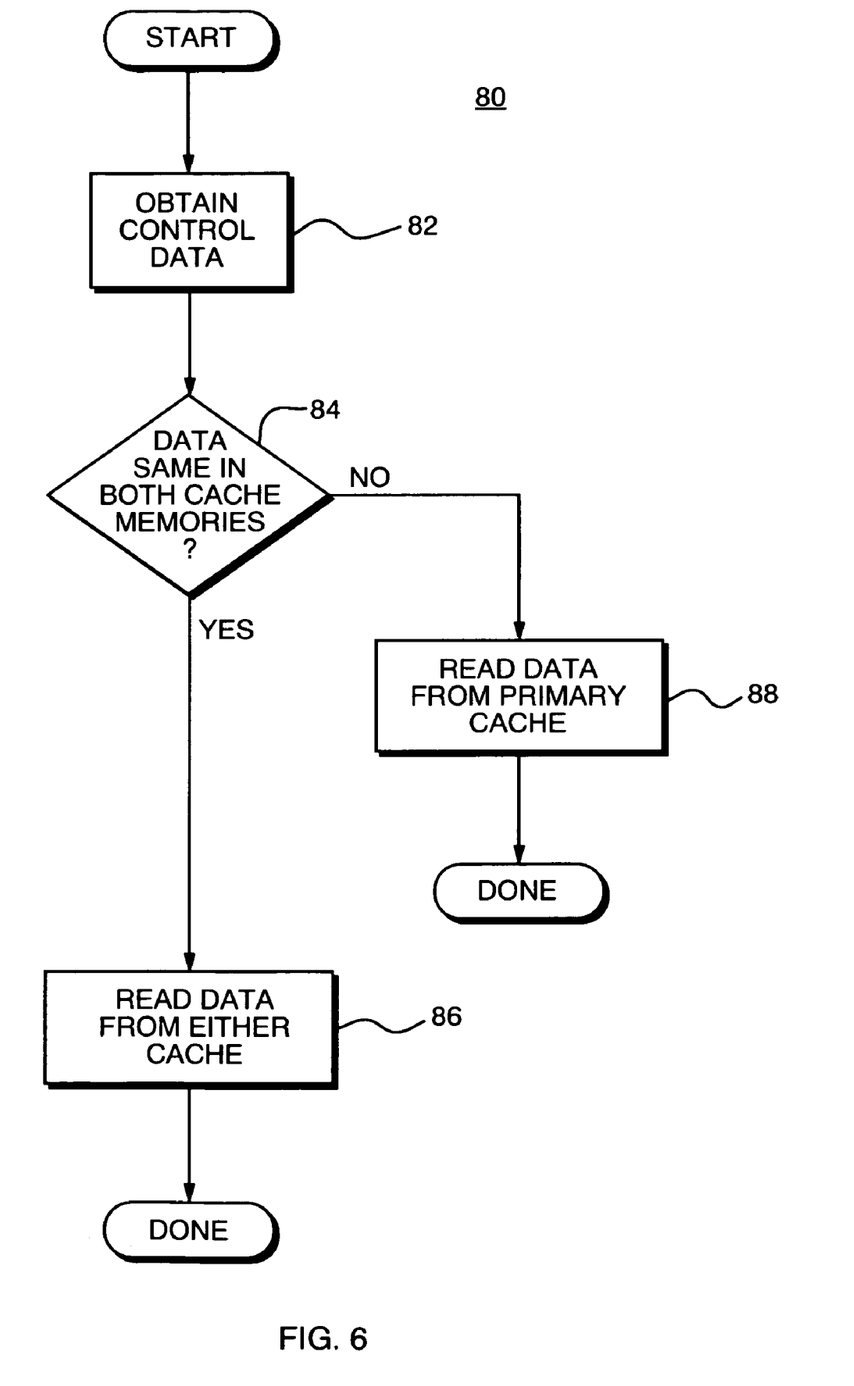
FIG. 6 is a flow chart illustrating steps performed in connection with a read operation executed by the host where data is being read from one or both of the cache memories.

Referring to FIG. 6, a flow chart 80 illustrates steps performed in connection with a read operation executed by the host where the data being read is in one or both of the cache memories 22, 24. Note that, if the hardware for one of the cache memories 22, 24 fails, then only one of the cache memories 22, 24 is used for all data read and write operations. However, in the course of normal operation, both of the cache memories 22, 24 are used to store data.

Processing begins at a first step 82 where the control data for the data being accessed is obtained. Note that, as discussed elsewhere herein, the control data is duplicated between the cache memories 22, 24. Thus, the selection of one of the cache memories 22, 24 from which to read the control data at the step 82 may be random, or may be alternative (i.e., round robin), or may be some other scheme that may or may not provide for balancing accesses and/or performance enhancement between the cache memories 22, 24. In some embodiments, it may be desirable to provide load balancing and/or performance enhancement in connection with read operations.

Following the step 82 is a step 84 where it is determined if the data is the same in both of the cache memories 22, 24. As discussed above, this information may be provided by the corresponding control data element. If it is determined at the test step 84 that the data is the same in both of the cache memories 22, 24, then the data may be read from either one of the cache memories 22, 24. Thus, if it is determined at the step 84 that the data is the same in both of the cache memories 22, 24, then control passes from the step 84 to a step 86, where the data is read from either of the cache memories 22, 24. In some embodiments, at the step 86 the data is read from the one of the cache memories 22, 24 that is used at the step 82 to obtain the control data. In other embodiments, at the step 86 the data is read from the one of the cache memories 22, 24 opposite to the one of the cache memories 22, 24 that is used at the step 82. Following the step 86, processing is complete.

If it is determined at the test step 84 that the data is not the same in both of the cache memories 22, 24, then control passes from the test step 84 to a step 88 where the data is read from the primary cache for the data. The distinction between primary and secondary cache storage is discussed elsewhere herein. Following the step 88, processing is complete.

Figure 7A:
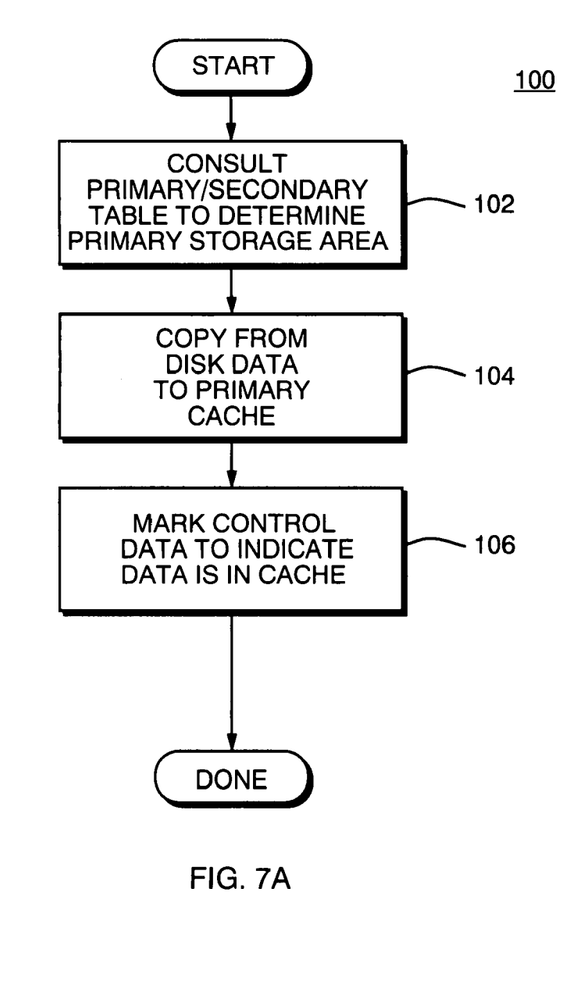
FIG. 7A is a flow chart illustrating steps performed in connection with providing data from the disk storage area to the cache memories according to the system described herein.

Referring to FIG. 7A, a flow chart 100 illustrates steps performed in connection with providing data from the disk storage area 42 to the cache memories 22, 24. At a first step 102, it is determined which of the cache memories 22, 24 is the primary storage area for the data by consulting the primary/secondary table. Following the step 102 is a step 104 where the data is copied from the disk storage area 42 to the one of the cache memories 22, 24 corresponding to the primary storage area. Following the step 104 is a step 106 where the corresponding control data element, for both of the cache memories 22, 24, is marked to indicate that the corresponding data is in cache, thus indicating that the data has been read into the cache. As discussed above, the control data for each of the slots of the cache memories 22, 24 is duplicated. Thus, the control data element for any slot in one of the cache memories 22, 24 is made to equal the control data for the slot in the other one of the cache memories 22, 24 by writing the control data to both of the memories 22, 24 at the step 106. Following the step 106, processing is complete.

Figure 7B:
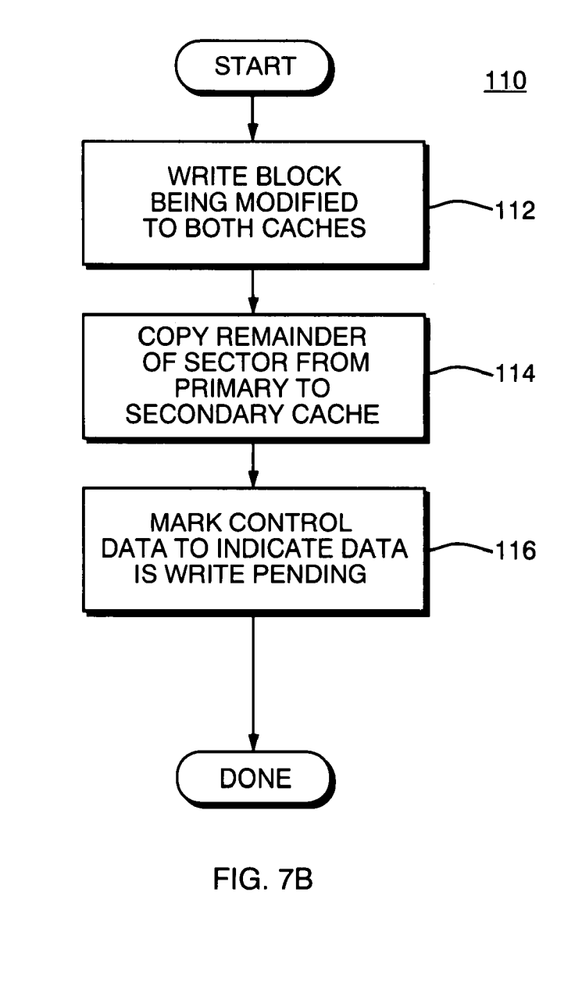
FIG. 7B is a flow chart illustrating steps performed in connection with handling data that is modified after the data has been read into the cache according to the system described herein.

Referring to FIG. 7B, a flow chart 110 indicates steps performed in connection with the data in the cache that has been modified (e.g., by a write from the host 44). Note that the steps of the flow chart 110 may be executed some time after the data has been read from the disk storage area 42 into the cache or may never be executed at all for some of the cache data.

At a first step 112, the block of data that is being modified (i.e., by the host 44) is written to both of the cache memories 22, 24. In each instance where data is modified, it is written to both of the caches 22, 24. However, the first time data from a slot (sector) is modified while in cache, other steps are also taken, as described below.

Following the step 112 is a step 114 where the remainder of the sector that includes the modified block is copied from the primary cache to the secondary cache. As discussed above, the embodiments disclosed herein operate a sector at a time, although is it would be apparent to one of ordinary skill in the art how to adapt the system to operate using different size data increments, such as a block. Thus, if the control data is provided on a per block basis, and if the cache holds and manipulates data in units of blocks, then it may be possible to forego the step 114. Note also that if the control data indicates that the data for the sector is the same in both of the cache memories 22, 24, then the step 114 may be omitted, since there would be no need to copy data that is already the same.

Following the step 114 is a step 116 where the control data for the particular slot, in both of the cache memories 22, 24, is marked to indicate that the slot is write pending, indicating that the data has been modified while stored in the cache. As discussed above, the control data is written to both the primary and secondary storage areas. Following step 116, processing is complete. Note that when the write pending data is destaged, the control data may indicate that the data is no longer write pending although the control data may also indicate that the sector data in both of the cache memories 22, 24 is identical.

The cache memories 22, 24 may be configured as separate memory boards (separate hardware) and, in some embodiments, may each have their own power supply. Using separate hardware for each of the cache memories 22, 24 decreases the likelihood that both of the cache memories 22, 24 will fail simultaneously. Thus, when the hardware for one of the cache memories 22, 24 fails, the process set forth in FIG. 5, discussed above, may be executed to reconfigure the system to operate using a single cache memory.

Following a failure, it may be possible to replace the failed hardware while the system is operational using techniques for doing so that are discussed, for example, in U.S. Pat. No. 6,078,503 to Gallagher et al., which is incorporated by reference herein. However, once the hardware for the failed memory board is replaced, it is necessary to have a plan for recovery so that the system can use both of the cache memories 22, 24 in connection with normal operation.

Figure 8:
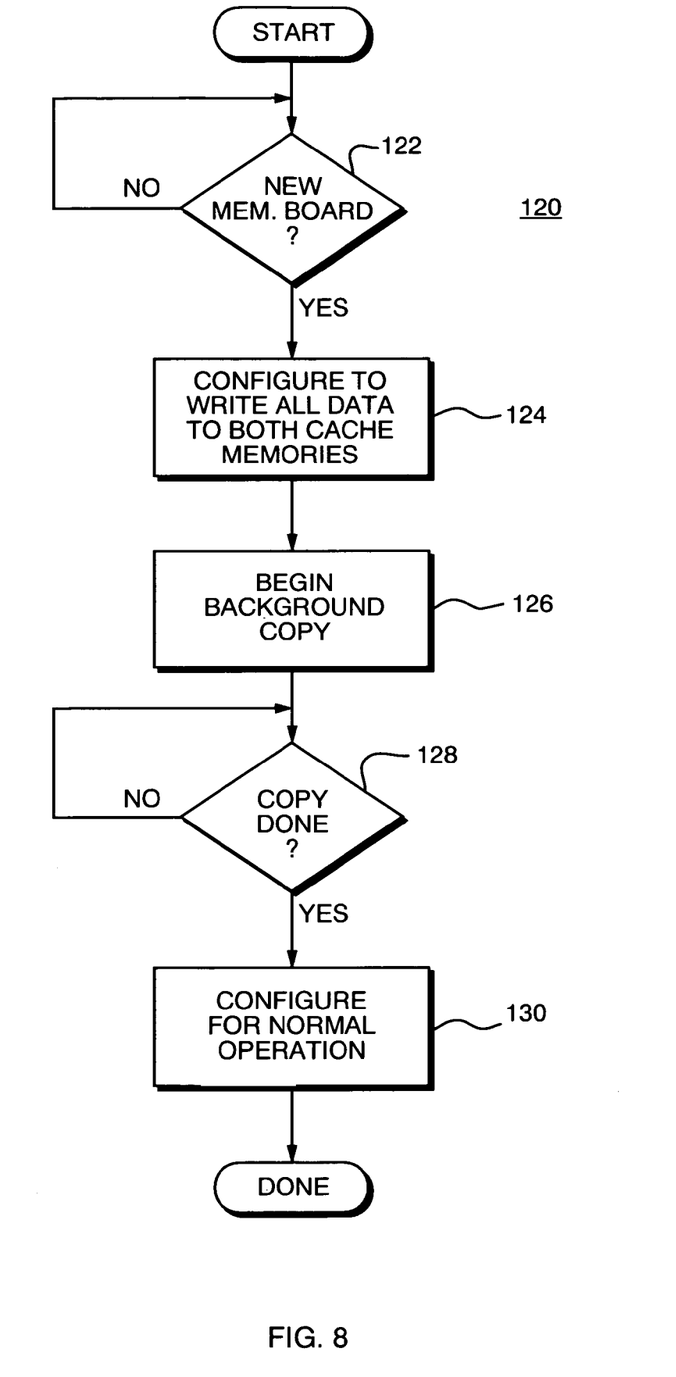
FIG. 8 is a flow chart illustrating steps performed in connection with recovery after failure and replacement of the hardware associated with one of the cache memories.

Referring to FIG. 8, a flow chart 120 illustrates steps performed after the hardware for one of the cache memories has failed. Processing begins at a first step 122 which determines if the failed memory hardware has been replaced by a new memory board. The test step 122 represents waiting until new, operational, hardware for the failed memory board is installed. Thus, until the hardware for the failed memory is replaced, the step 122 loops back on itself. Stated differently, the remaining steps of the flowchart 120 are not performed unless and until the failed memory board is successfully replaced.

Once the hardware for the failed memory has been replaced, control passes from the step 122 to a step 124 where the system is configured to write all data to both of the cache memories 22, 24. That is, every time data is read from the disk storage area 42 to cache, or data that is in cache is modified by the host 44, the data is written to both of the cache memories 22, 24.

Following the step 124 is a step 126 where background copying is begun. Background copying refers to copying data from the non-failing one of the cache memories 22, 24 to the other one of the cache memories 22, 24 that corresponds to the new memory hardware. Background copying occurs when the cache is otherwise not being used. Thus, the steps 124, 126 cause the cache memories 22, 24 to eventually become duplicates of each other.

Following the step 126 is a test step 128 which determines if background copying is complete. If not, the step 128 loops back on itself to wait for completion. Otherwise, once background copying is complete, the cache memories 22, 24 are duplicates of each other and control passes from the step 128 to a step 130, where the system is reconfigured to operate in the usual manner as discussed above in connection with FIG. 6, FIG. 7A, and FIG. 7B. Thus, when the hardware for one of the cache memories 22, 24 fails, the system operates with the single, non-failing cache memory. However, once the recovery process set forth in FIG. 8 is completed, then the system is reconfigured to have a primary and secondary cache and to operate in the usual manner, as discussed above.

When the same data is stored en in both of the cache memories 22, 24, it is possible for the host system 44 to access the data from either of the cache memories 22, 24. Accordingly, in some instances, it may be possible to enhance performance by balancing access between the cache memories 22, 24. Depending upon the hardware configuration, it may be possible to access one of the cache memories 22, 24 while simultaneously accessing the other one of the cache memories 22, 24. Thus, balancing the accesses could enhance performance by increasing the number of simultaneous accesses and correspondingly decreasing the number of (inherently inefficient) serial accesses to the same one of the cache memories 22, 24.

Referring to FIGS. 9–13, a plurality of partial flow charts 80a–80e illustrate modifications to the read operation illustrated in FIG. 6 and described above. The modifications facilitate balancing accesses of the data to increase throughput and enhance performance.

Figure 9:
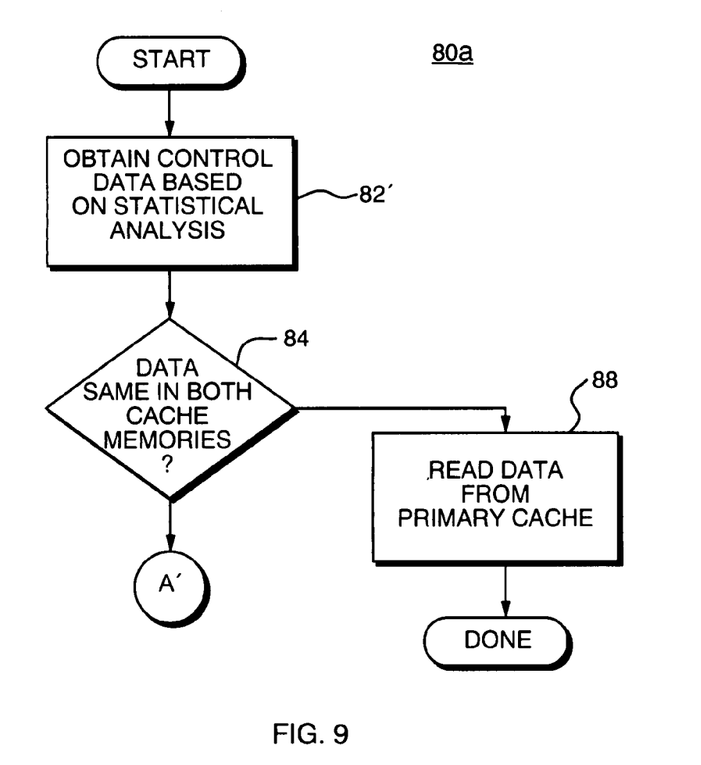
FIG. 9 is a partial flow chart illustrating a portion of the steps performed in connection with a host accessing data in the cache memories including obtaining control data based on statistical analysis.

The partial flow chart 80a of FIG. 9 illustrates an alternative step 82' that corresponds to the step 82 of FIG. 6 where the control data is accessed. As discussed above, for embodiments illustrated herein, the control data is the same for both of the cache memories 22, 24. The step 82' represents choosing which of the cache memories 22, 24 to use for accessing the control data based on a statistical analysis. Although many different types of statistical analysis techniques could be used and would be apparent to one of ordinary skill in the art, for one embodiment of the invention, the statistical analysis of FIG. 82' simply tallies the number of accesses of each of the memories 22, 24 over a predetermined amount of time, such as one second. That is, if for the one second prior to the current access, the number of accesses of the cache memory 22 is N and the number of accesses to the cache memory 24 is M, then, if N<M, the cache memory 22 will be used, since the cache memory 22 is the one of the cache memories 22, 24 having the least number of previous accesses in the previous one second. Steps associated with the connector A' shown in FIG. 9 are described in more detail elsewhere herein.

Figure 10:
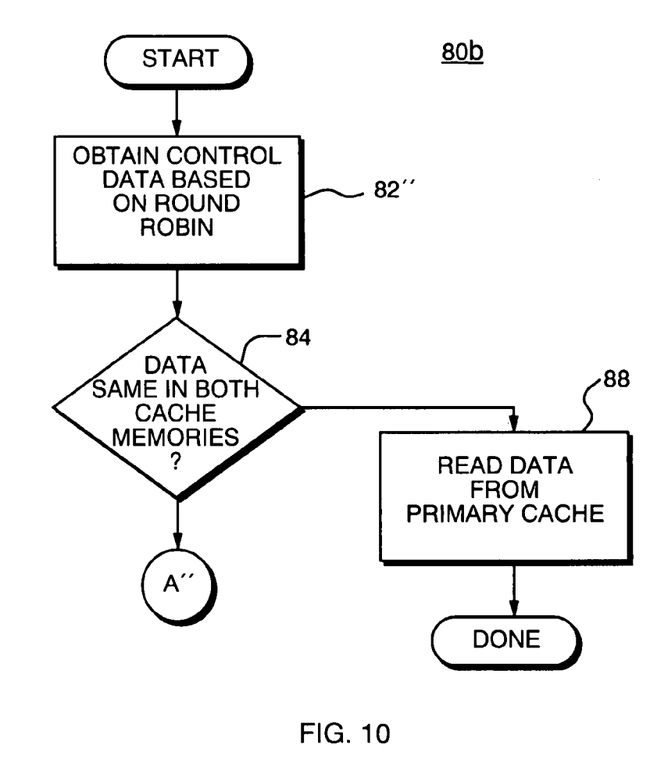
FIG. 10 is a partial flow chart illustrating a portion of the steps performed in connection with a host accessing data in the cache memories including obtaining control data based on a round robin scheme.

Referring to FIG. 10, the partial flow chart 80b illustrates another alternative step 82' that corresponds to the step 82 of FIG. 6 where the control data is accessed. The step 82' represents accessing the control data using a conventional round robin technique (discussed above), where one of the cache memories 22, 24 is chosen based on which of the cache memories 22, 24 was previously not chosen. That is, if in the most recent iteration the cache memory 22 was used, then in the current iteration the cache memory 24 is used. Similarly, if in the most recent iteration the cache memory 24 was used, then in the current iteration the cache memory 22 is used.

Figure 11:
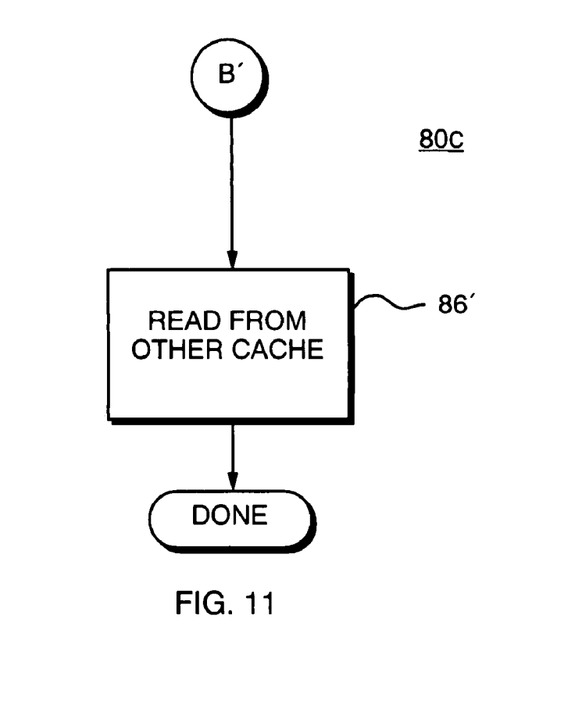
FIG. 11 is a partial flow chart illustrating a portion of the steps performed in connection with a host accessing data in the cache memories including reading data from another cache.

Referring to FIG. 11, the partial flow chart 80c illustrates an alternative step 86' that corresponds to the step 86 of FIG. 6 where disk data that is the same in both of the cache memories 22, 24 is accessed. For the step 86', the disk data is read from the one of the cache memories 22, 24 that is opposite to the one of the cache memories 22, 24 used to access the control data. That is, irrespective of the technique for selecting which of the cache memories 22, 24 to use to access the control data, the step 86' represents reading the disk data from the other one of the cache memories 22, 24. Thus, for example, if the control data is read from the cache memory 22, then the step 86' represents reading the disk data from the cache memory 24. Similarly, if the control data is read from the cache memory 24, then the step 86' represents reading the disk data from the cache memory 22.

Figure 12:
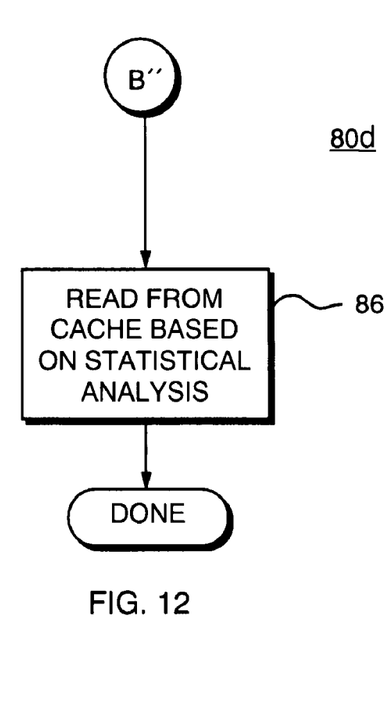
FIG. 12 is a partial flow chart illustrating a portion of the steps performed in connection with a host accessing data in the cache memories including read data based on statistical analysis.

Referring to FIG. 12, the partial flow chart 80d illustrates an alternative step 86' that corresponds to the step 86 of FIG. 6 where disk data that is the same in both of the cache memories 22, 24 is accessed. The step 86" represents selecting the one of the cache memories 22, 24 from which to read the disk data using a simple statistical technique similar to that discussed above in connection with the step 82' of FIG. 9 used to select which of the cache memories 22, 24 to use for reading the control data. In some embodiments, the period for compiling the statistics is one second.

Figure 13:
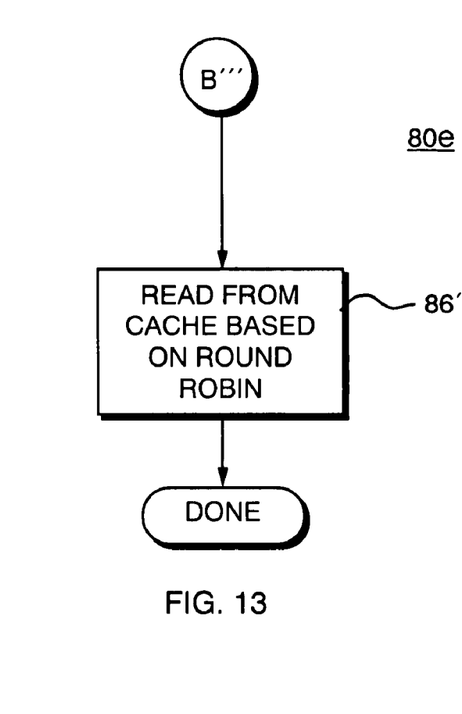
FIG. 13 is a partial flow chart illustrating a portion of the steps performed in connection with a host accessing data in the cache memories including reading data from cache based on a round robin scheme.

Referring to FIG. 13, the partial flow chart 80e illustrates an alternative step 86''' that corresponds to the step 86 of FIG. 6 where disk data that is the same in both of the cache memories 22, 24 is accessed. The step 86''' represents selecting the one of the cache memories 22, 24 from which to read the disk data using a round robin technique similar to that discussed above in connection with the step 82" of FIG. 10 for selecting which of the cache memories 22, 24 to use for reading the control data.

Note the partial flow chart 80a includes a connector A' while the partial flow chart 80b includes a connector A". Similarly, the partial flow chart 80c includes a connector B', the partial flow chart 80d includes a connector B", and the partial flow chart 80e includes a connector B'''. For the system illustrated herein, the connector A' may be coupled to any of the connectors B', B", and B"'. Similarly, the connector A" may be coupled to any of the connectors B', B", and B"'. Thus, the technique used to select which of the cache memories 22, 24 to use to access the control data may be somewhat independent of the technique used to access the disk data. Note also that it is possible to use one of the techniques discussed herein for accessing only the control data while using a different technique (or no technique) for accessing the disk data. Similarly, it is possible to use one of the techniques discussed herein for accessing only the disk data while using a different technique (or no technique) for accessing the control data.

Figure 14:
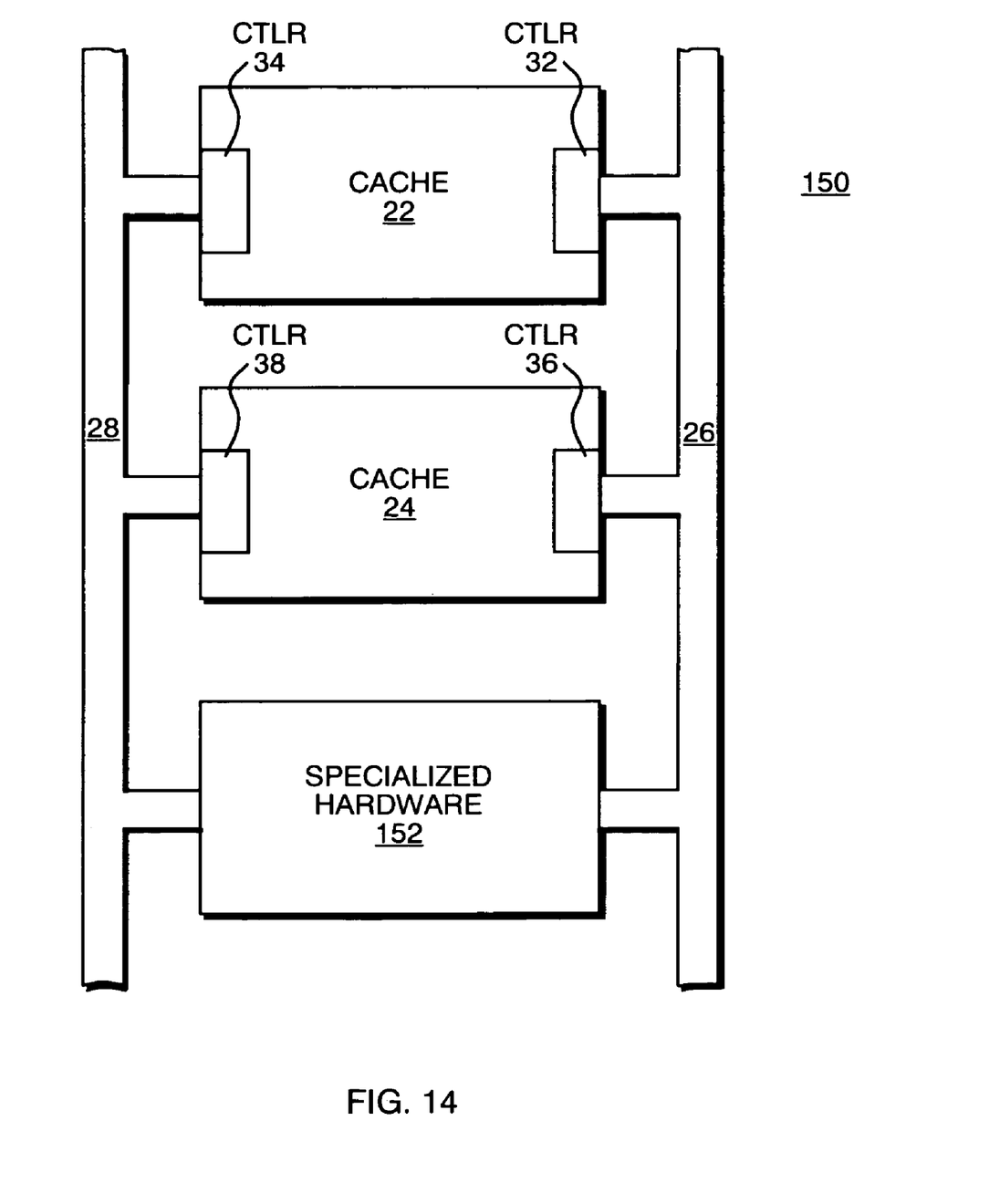
FIG. 14 illustrates specialized hardware for providing the functionality illustrated in connection with FIGS. 9–13.

Referring to FIG. 14, a diagram illustrates specialized hardware 152 for providing the functionality, or at least a portion of the functionality, described above in connection with FIGS. 9–13. The hardware 152 may be implemented using any one of a variety of technologies for designing customized hardware. The hardware 152 may be implemented using a single chip or a plurality of chips. The hardware 152 may receive access requests for a cache via one or both of the buses 26, 28, or through some means (not illustrated in FIG. 14) The hardware 152 may then process the requests in accordance with one or more of the techniques discussed above, and then read the data from one of the cache memories 22, 24.

Note that using the hardware 152 may reduce the requirements of keeping additional statistics because the hardware may have direct access to information used in connection with the techniques described herein.

In accordance with one aspect of the invention is a computer program product for managing data in a cache. Machine executable code is included for: providing a first cache memory that contains data; providing a second cache memory that contains data wherein at least some of the data in the first cache memory is the same as at least some of the data in the second cache memory; and, in response to a request for data that is stored in both the first cache memory and the second cache memory, choosing one of the cache memories to use to obtain the data according to an access balancing technique.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method of managing data in a cache, comprising:
providing a first cache memory containing data;
providing a second cache memory containing data, wherein at least some of the data contained in the first cache memory is the same as at least some of the data contained in the second cache memory, wherein data contained in said first and said second cache memories includes control data and corresponding disk data, said control data being replicated in both said first and said second cache memories regardless of a modification status of said corresponding disk data; and
in response to a request for data that is stored in both the first cache memory and the second cache memory, selecting which one of the first and second cache memories to use to obtain the requested data in accordance with an access balancing technique.

2. A method, according to claim 1, wherein the access balancing technique includes at least one of: selection using round robin and selection based on statistical analysis.

3. A method, according to claim 2, wherein the selection based on statistical analysis includes:
monitoring a number of accesses of the first cache memory over a predetermined amount of time;
monitoring a number of accesses of the second cache memory over the predetermined amount of time; and
selecting one of the cache memories having a lowest number of accesses over the predetermined amount of time.

4. A method, according to claim 1, wherein a first balancing technique is used to balance access to the control data and a second balancing technique is used to balance access to the disk data.

5. A method, according to claim 4, wherein the first and second balancing techniques are the same.

6. A method, according to claim 5, wherein the first and second access balancing techniques include at least one of: selection using round robin and selection based on statistical analysis.

7. A method, according to claim 1, wherein selecting which one of the first and second cache memories includes using specialized hardware.

8. The method of claim 7, wherein the specialized hardware includes at least one chip.

9. The method of claim 7, further comprising:
receiving, by the specialized hardware, requests for data from at least one of the first and second cache memories.

10. The method of claim 9, further comprising:
processing, by the specialized hardware, the requests in accordance with the access balancing technique.

11. The method of claim 10, further comprising:
subdividing the data contained in said first and second cache memories into control data and corresponding disk data.

12. The method of claim 11, further comprising:
using the specialized hardware to access at least one of said control data and said corresponding disk data.

13. The method of claim 1, wherein, when said corresponding disk data has not been modified and said control data is replicated in said first and said second cache, said corresponding disk data is only in one of said first and second cache memories.

14. A method of managing data in a cache, comprising:
providing a first cache memory containing data;
providing a second cache memory containing data, wherein at least some of the data contained in the first cache memory is the same as at least some of the data contained in the second cache memory;
in response to a request for data that is stored in both the first cache memory and the second cache memory, selecting which one of the first and second cache memories to use to obtain the requested data in accordance with an access balancing technique; and
subdividing the data contained in said first and said second cache memories into control data and corresponding disk data, wherein a first balancing technique is used to balance access to the control data and a second balancing technique is used to balance access to the disk data, and wherein the first and second balancing techniques are different.

15. A method, according to claim 14, wherein the first access balancing technique includes at least one of: selection using round robin and selection based on statistical analysis.

16. A method, according to claim 15, further comprising:
in response to selecting the first cache memory for accessing the control data, accessing the second cache memory for the corresponding disk data; and
in response to selecting the second cache memory for accessing the control data, accessing the first cache memory for the corresponding disk data.

17. A method, according to claim 15, wherein the second access balancing technique includes at least one of: selection using round robin and selection based on statistical analysis.

18. A system for managing data in a cache comprising:
a first cache memory containing data;
a second cache memory containing data wherein at least some of the data contained in the first cache memory is the same as at least some of the data contained in the second cache memory, wherein data contained in said first and said second cache memories includes control data and corresponding disk data, said control data being replicated in both said first and said second cache memories regardless of a modification status of said corresponding disk data; and
cache selection hardware for selecting, in response to a request for requested data that is stored in both the first cache memory and the second cache memory, which one of the first and second cache memories to use to obtain the requested data in accordance with an access balancing technique.

19. The system of claim 18, wherein said access balancing technique is a first access balancing technique and the system further comprises:
machine executable code for selecting which one of the access balancing technique and a second access balancing technique to use to obtain data stored in both the first and second cache memories;
machine executable code for selecting, in response to a request for requested data that is stored in both the first cache memory and the second cache memory and selecting said second access balancing technique, which one of the first and second cache memories to use to obtain the requested data in accordance with said second access balancing technique.

20. The system of claim 18, wherein said cache selection hardware is used in implementing one of the first and second access balancing techniques, and the machine executable code is used in implementing a different one of the first and second balancing techniques than the cache selection hardware.

21. The system of claim 20, wherein said first and second access balancing techniques include at least one: selection using round robin and selection based on statistical analysis.

22. The system of claim 20, wherein said cache selection hardware is used in implementing at least one of said first and second balancing techniques, and the machine executable code is used in implementing at least one of said first and second balancing techniques.

23. The system of claim 22, wherein said first and second access balancing techniques include at least one: selection using round robin and selection based on statistical analysis.

24. The system of claim 23, wherein the cache selection hardware selects the first cache memory for accessing the control data; and
selects the second cache memory for the disk data corresponding to the control data when said first cache memory is used for accessing the control data.

25. The system of claim 24, wherein the cache selection hardware:
selects the second cache memory for accessing the control data; and
accesses the first cache memory for the disk data corresponding to the control data when said second cache memory is used for accessing the control data.

26. The system of claim 23, wherein said cache selection hardware selects the first cache memory for accessing the control data; and
accesses the second cache memory for the disk data corresponding to the control data when said first cache memory is used for accessing the control data.

27. The system of claim 26, wherein said cache selection hardware selects the second cache memory for accessing the control data; and
accesses the first cache memory for the disk data corresponding to the control data when said second cache memory is used for accessing the control data.

28. The system of claim 18, further comprising:
a first bus used for sending communications between at least one of the first cache memory and the second cache memory, and the cache selection hardware; and
a second bus used for sending communications between at least one of the first cache memory and the second cache memory, and the cache selection hardware.

29. The system of claim 28, wherein said first bus is used for facilitating communications between said cache selection hardware and said first cache memory, and said second bus is used for facilitating communications between said cache selection hardware and said second cache memory.

30. The system of claim 18, wherein, when said corresponding disk data has not been modified and said control data is replicated in said first and said second cache, said corresponding disk data is only in one of said first and second cache memories.

31. A computer program product including a computer readable medium for managing data in a cache, the computer readable medium comprising:
processor executable code for providing a first cache memory containing data;
processor executable code for providing a second cache memory containing data, wherein at least some of the data contained in the first cache memory is the same as at least some of the data contained in the second cache memory, wherein data contained in said first and said second cache memories includes control data and corresponding disk data, said control data being replicated in said first and said second cache memories regardless of a modification status of said corresponding disk data; and
processor executable code for, in response to a request for data that is stored in both the first cache memory and the second cache memory, selecting which one of the first and second cache memories to use to obtain the requested data in accordance with an access balancing technique.

32. The computer program product, according to claim 31, wherein the processor executable code for selecting which one of the first and second cache memories to use to obtain the data in accordance with an access balancing technique, includes processor executable code for at least one of: selection using round robin and selection based on statistical analysis.

33. The computer program product, according to claim 32, wherein the processor executable code for selection based on statistical analysis, includes processor executable code for:

monitoring a number of accesses of the first cache memory over a predetermined amount of time;

monitoring a number of accesses of the second cache memory over the predetermined amount of time; and selecting one of the cache memories having a lowest number of accesses over the predetermined amount of time.

34. The computer program product, according to claim 31, wherein the computer readable medium further comprises processor executable code for a first balancing technique used to balance access to the control data and a second balancing technique used to balance access to the disk data.

35. The computer program product, according to claim 34, wherein the first and second balancing techniques are the same.

36. The computer program product, according to claim 35, wherein the processor executable code for the first and second access balancing techniques includes processor executable code for at least one of: selection using round robin and selection based on statistical analysis.

37. The computer program product, according to claim 34, wherein the first and second balancing techniques are different.

38. The computer program product, according to claim 37, wherein the processor executable code for the first access balancing technique includes processor executable code for at least one of: selection using round robin and selection based on statistical analysis.

39. The computer program product, according to claim 38, wherein the computer readable medium further comprises processor executable code for:

in response to selecting the first cache memory for accessing the control data, accessing the second cache memory for the corresponding disk data; and in response to selecting the second cache memory for accessing the control data, accessing the first cache memory for the corresponding disk data.

40. The computer program product, according to claim 38, wherein the processor executable code for the second access balancing technique includes processor executable code for at least one of: selection using round robin and selection based on statistical analysis.

41. The computer program product of claim 31, wherein, when said corresponding disk data has not been modified and said control data is replicated in said first and said second cache, said corresponding disk data is only in one of said first and second cache memories.

* * * * *